(12) United States Patent
Goto et al.

(10) Patent No.: US 6,352,371 B1
(45) Date of Patent: Mar. 5, 2002

(54) SYNTHETIC RESIN CROWN SHAPED RETAINER FOR BALL BEARING

(75) Inventors: Junji Goto; Tohru Kamano, both of Osaka; Shigenori Bando, Nara-ken, all of (JP)

(73) Assignee: Koyo Seiko Co., Ltd. (JP)

( * ) Notice: Subject to any disclaimer, the term of this patent is extended or adjusted under 35 U.S.C. 154(b) by 0 days.

(21) Appl. No.: 09/609,182

(22) Filed: Jun. 30, 2000

(30) Foreign Application Priority Data

Jul. 5, 1999 (JP) ............................................ 11-225615

(51) Int. Cl.$^7$ ................................................. F16C 33/41
(52) U.S. Cl. ........................ 384/470; 384/523; 384/531
(58) Field of Search ................................. 384/470, 531, 384/523, 532, 572

(56) References Cited

U.S. PATENT DOCUMENTS 4,941,759 A * 7/1990 Dreschmann et al.
5,082,375 A * 1/1992 Hillmann

* cited by examiner

Primary Examiner—Lenard A. Footland
(74) Attorney, Agent, or Firm—Adams & Wilks

(57) ABSTRACT

The present invention provides a synthetic resin crown-shaped retainer for ball bearing, which permits the reduction in the deformation of pawls and the prevention of scattering over of grease. The retainer includes an annulus with annular faces formed on both sides perpendicularly with respect to the axis, a plurality of pockets made up of recesses that are formed at circumferentially spaced intervals on one of the annular faces; pairs of pawls provided at both ends of the respective pockets and axially projecting from one of the annular faces of the annulus so as to prevent the ball from dropping out pockets, wherein said pairs of pawls comprise first and second pairs of pawls that are circumferentially provided on the one annular face of said annulus in alternate arrangement, and wherein each barriers for preventing grease from scattering out said retainer circumferentially extend from a back face of said first pair of pawls to a back face of said second pair of pawls, and have a cut-away portion at a contact with one of said second pawls so as to prevent the respective pairs of pawls from being deformed by shrinkage stress of synthetic resin after its formation or production, whereby said pockets are alternately first pockets each having said first pair of pawls and pockets each having said second pair of pawls.

2 Claims, 2 Drawing Sheets

US 6,352,371 B1

SYNTHETIC RESIN CROWN SHAPED RETAINER FOR BALL BEARING

FIELD OF THE INVENTION

The present invention relates to a synthetic resin crown-shaped retainer for ball bearing, and particularly to a synthetic resin crown-shaped retainer (hereinafter, retainer) as applied to a ball bearing used for devices such as polygon mirrors.

BACKGROUND OF THE INVENTION

A retainer in relationship with the present invention is used for ball bearings as applied to devices such as polygon mirrors.

The retainer comprises an annulus having an inner peripheral surface, an outer peripheral surface, and plane surfaces formed on both sides thereof perpendicularly with respect to the axis, and a plurality of pockets made up of recesses which are formed at circumferentially spaced intervals on one of the plane surfaces, and a pair of pawls provided at each ends of the pocket and axially projecting from the one of plane surfaces of the annulus. The retainer has basins between the respective pawls, which are greased.

When the ball bearing were rotated, the grease in the basins often passed the pawls to fly out the retainer by the centrifugal force. For this reason, the ball bearing was often subjected to the instantaneous large fluctuations in its speed variations (called in general jitter). In addition, the fluctuations in the speed variations are caused by spacing of clearances to balls from its pawls being increased. The increase in the spacing of the clearance between the respective balls and pawls are of ten caused during the time when a retainer is removed from a metal mold, because the pawls are pulled by force applied to the retainer by the shrinkage stress of the synthetic resin after its formation or production.

The fluctuations in the speed variations affected the performance of the polygon mirror.

Therefore, it is required to prevent grease from being scattered out the basins of the retainer and to restrain the pawls from deforming after being removed from the metal mold.

SUMMARY OF THE INVENTION

In order to solve the problems point ed out above, the present invention provides a ball bearing, which includes an inner race, an outer race, a plurality of balls, and a retainer having an annulus, the annulus having annular faces on both sides thereof perpendicularly with respect to the axis, a plurality of pockets made up of recesses which are formed at circumferentially spaced intervals on one of the annular faces, respectively, a pair of pawls provided at both ends of the pocket and axially projecting from one of the annular faces of the annulus so as to prevent the ball from dropping out pockets, and a plurality of plane faces having wells in which grease is kept between the respective pairs of pawls, respectively, wherein the retainer having barriers connected with the back faces of the respective pairs of pawls and circumferentially formed on one of the annular faces, and wherein the pairs of pawls comprise alternate pairs of pawls having each a barrier integrally joined to the respective back faces thereof, and having each a barrier partially joined to the respective back faces thereof.

Each of the barriers are formed along an external edge of the respective plane surface between respectively the back faces of said pawls.

PREFFERED EMBODIMENTS OF THE INVENTION

Figure 1:
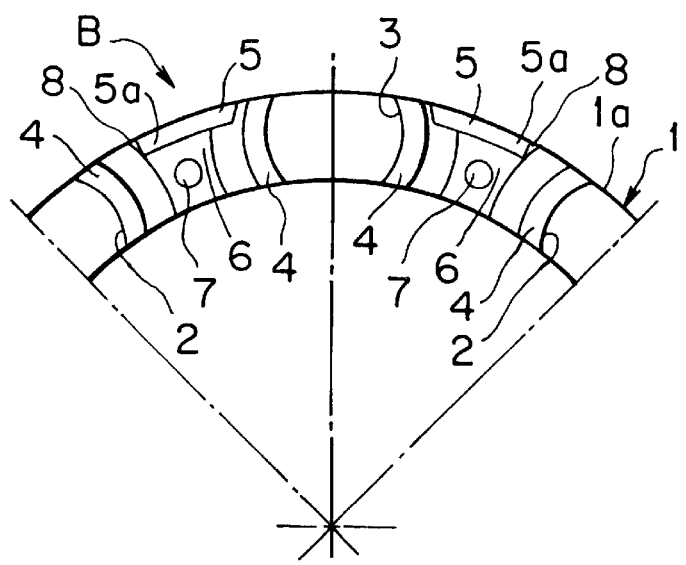
FIG. 1 is a plane view showing an embodiment of a retainer of the present invention.
Figure 2:
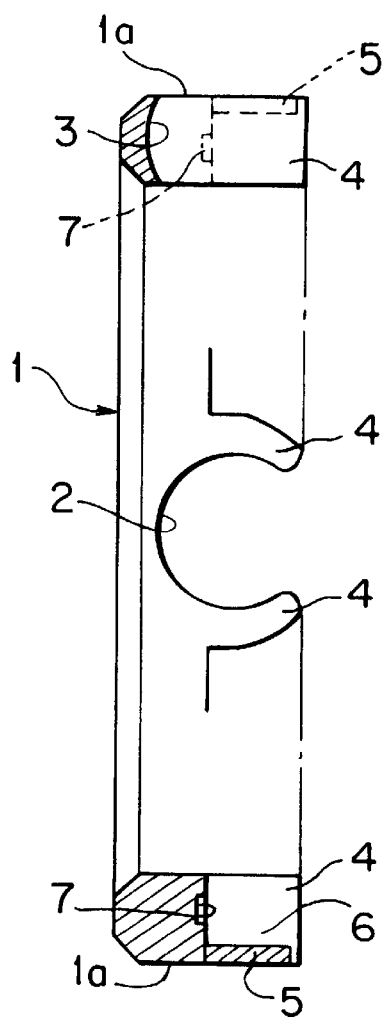
FIG. 2 is a developed side view of the retainer as illustrated in FIG. 1.
Figure 3:
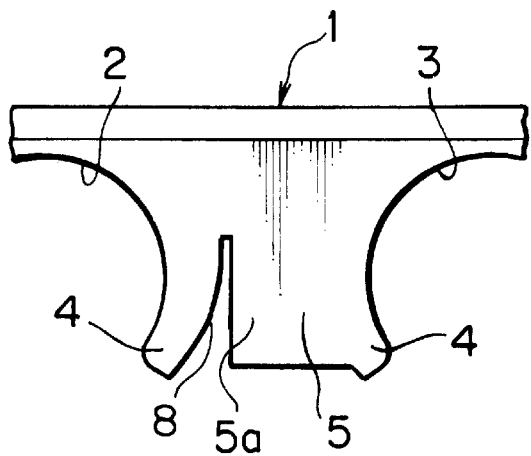
FIG. 3 is an enlarged view of the retainer looking in the direction indicated by the arrow B of FIG. 1.

Description of embodiment of the present invention is made by reference to FIGS. 1 to 3.

Referring to FIG. 1 which is of a plane view, there is shown part of a retainer. Numeral reference 1 denotes an annulus having a plurality of pockets 2, 3 each made up of a recess which is formed at circumferentially spaced intervals on one annular face 1a, and a pair of first and second pawls 4 provided at both ends of the pockets 2, 3 and axially projecting from one plane surface of the annulus 1 so as to prevent dropping of balls, respectively.

The annulus 1 has plane surfaces each provided between the pairs of first and second pawls 4, wells 6 provided on the plane surfaces, which are greased, respectively, each of the wells 6 being recessed along the side edge at the position spaced from the back faces of the first and second pawls 4 at both sides thereof, and having a knocking hole 7 at its center as utilized to stamp out a retainer from a die after the retainer was produced in molding process.

FIG. 2 is a developed side view taken of the back side of the annulus 1. Barriers 5 are arranged in the retainer to provide for the prevention of scattering over of grease. Each of the barriers 5 are formed between the back faces of the first and second pawls 4 at the sides thereof along an arc line, preferably, an outer arc line of the annulus 5 such that the respective barriers 5 extend from the back face of the first pawl 4 about the pocket 3 to the back face of the second pawl 4 on the side of the pocket 2.

The bottoms of the pockets 2, 3 each are formed on the annular surface 1a of the annulus 1 along the substantially part-spherical surface of balls (not shown), and comprise a recess. The knocking holes 7 are positioned at substantially the center of the annular surface 1a of the annulus 1. The barriers 5 are formed integrally with the first and second pawls 4 at the sides thereof.

Thus, when the ball bearing is rotated, even though the wells 6 of the retainer are filled with the grease, the grease is not scattered out the retainer by the centrifugal force.

As above described, the barriers 5 act well on effects of preventing the scattering over of the grease. However, in the case where the barriers 5 extend the length between the back faces of the pawls 4, respectively, they cause the pawls 4 to be pulled out from the side of the arrow C in FIG. 5 by the shrinkage stress of the synthetic resin after its formation or production, and this can result in widening the spacing D between the respective pairs of pawls 4 relative to design values. Hence, the respective clearances to balls from pockets (clearances of pockets) are produced larger than are normally required, and therefore exerts an undesirable influence on the movement of the retainer to cause the speed variation (jitter) to be changed large.

For the prevention of the widening pawls 4 under the shrunken synthetic resin, the retainer of the present invention is designed as follows.

FIG. 3 is an enlarged detail front view of the retainer of the present invention taken along the arrow line B. Each of the barriers 5 of the retainer 1 are cut away at the portion where the pawl 4 on the side of the pockets 2 joins thereto. The cut-away portions 8 each have a straight line axially extending from substantially the center of the barrier 5 and a curved line extending from substantially the center of barrier 5 generally along the arc line of the pawl 4.

Each of the cut-away portions 8 give effects of preventing the deformation of the pawl 4 when the retainer is formed or produced, and thus permits a maintenance of the design values setting the distance in the clearances between respectively the pockets and balls. Hence, the retainer of the present invention allows for prevention of large variances in the rotational speed of the bearing.

Description will now be made in further detail of the cut away portion 8 of the barrier 5.

Figure 4:
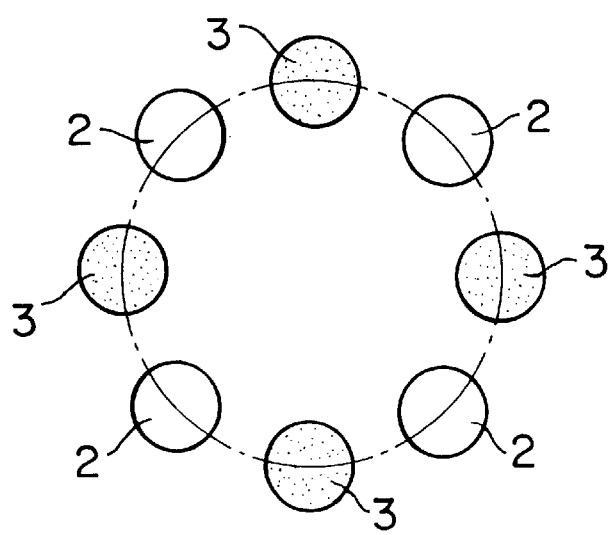
FIG. 4 is a schematic view of showing an arrangement of pockets of the retainer, looking from the top.

FIG. 4 is a schematic view of showing the arrangement of the pockets 2, 3 of the present invention. The pockets 2, 3 of the retainer are alternately arranged on the one annular face. It is understand from the above that the cut away portions 8 are provided in the pockets 2 but not provided in the pockets 3, respectively.

Figure 5:
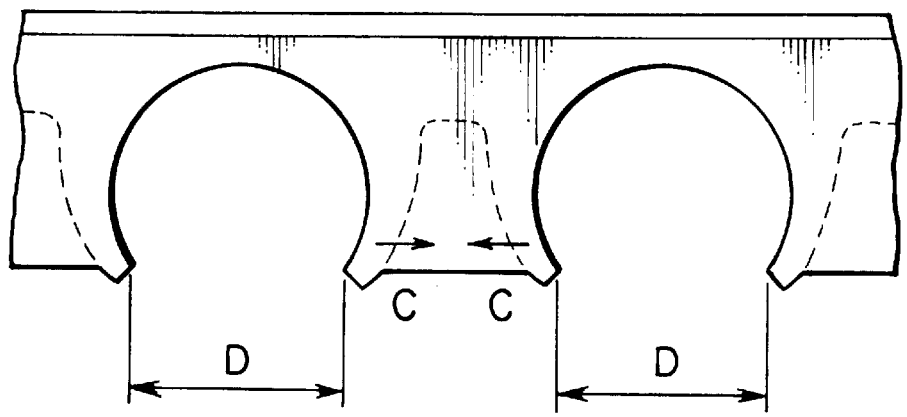
FIG. 5 is a developed side view of a conventional retainer.

As shown in FIG. 5, after a retainer is formed by a metal mold, each of the pawls 4 are pulled in the side of the barrier 5 (indicated by the arrow C) by the shrinkage stress of the synthetic resin. As the retainer (see FIG. 3) of the present invention has the cut-away portions 8 between the second pawls 4 and the barriers 5, respectively, the first and second pawls 4 are not pulled in the side of the pocket by the shrinkage stress of the barriers 5, while it is not subjected to the shrinkage stress on the first and second pawls 4. Thus, it is obvious that the respective clearances to balls from its pockets remain substantially the same as design values.

Effects of the Invention

The present invention provided to prevent grease from scattering out the retainer, while restricting the deformation of pawls that was caused by the shrinkage stress of synthetic resin after the formation or production of the retainer, because the retainer had the barriers between the pockets, respectively, and the respective barriers had the cut away portions on the side of one pockets. Hence, not only the respective clearances to the balls from the pockets remained the same as design values, but also the variances in the rotational speed of the bearing were restricted. In addition, the respective barriers disposed along the external edge of the annular face permitted forming relatively enlarged areas adopted as grease wells between the respective pawls.

What is claimed is:

1. A ball bearing having an inner race, an outer race, a plurality of balls, and a synthetic resin crown shaped retainer, the synthetic resin crown shaped retainer having an annulus, the annulus having a plurality of pockets made up of recesses that are formed at circumferentially spaced intervals on one of annular faces, respectively pairs of pawls provided at both ends of the pockets and axially projecting from one of the annular faces of the annulus so as to prevent the ball from dropping out a pocket, and a plurality of plane surfaces, which are greased between the respective pairs of pawls, said retainer including:

said pairs of pawls which comprise first pairs of pawls and second pairs of pawls that are circumferentially provided on one of the annular faces of said annulus in alternate arrangement, and barriers for preventing grease from scattering out said retainer, the barriers each circumferentially extending from back faces of said respective first pairs of first pawls to back faces of said respective second pairs of pawls, and each having a cut away portion at a contact with said second pair of pawls, said pockets being alternately first pockets each having said first pairs of pawl and second pockets each having said second pairs of pawl.

2. The ball bearing defined in claim 1, wherein said synthetic resin crown shaped retainer includes said barriers formed along an external edge of said annulus.

\* \* \* \* \*